United States Patent
Shakespear

[11] 3,727,961
[45] Apr. 17, 1973

[54] FLUID SHOCK ABSORBING BUMPER ASSEMBLY

[75] Inventor: Horacio Shakespear, Orchard Lake, Mich.

[73] Assignee: General Motors Corporation, Detroit, Mich.

[22] Filed: Dec. 13, 1971

[21] Appl. No.: 207,113

[52] U.S. Cl. .................... 293/68, 280/124 F, 294/89
[51] Int. Cl. ......... B60r 19/06, B61f 19/04, F16c 9/06
[58] Field of Search .................... 280/124 F; 293/68, 293/89, 90

[56] References Cited

UNITED STATES PATENTS

| | | | |
|---|---|---|---|
| 1,329,993 | 2/1920 | Newton | 293/68 |
| 1,770,096 | 8/1930 | Baker | 293/68 |
| 2,890,076 | 6/1959 | Baechler | 293/90 |
| 2,914,339 | 11/1959 | Gouirand | 280/124 F |

*Primary Examiner*—Gerald M. Forlenza
*Assistant Examiner*—Howard Beltran
*Attorney*—W. E. Finken et al.

[57] ABSTRACT

An energy absorbing device particularly adapted for automotive applications and functional in a first mode to damp the primary suspension spring of the vehicle and in a second mode to absorb the energy of impact on the bumper bar of the vehicle, the device including a composite tube assembly rigidly supported on the vehicle sprung mass portion, a support tube telescopically supported on the composite tube assembly and rigidly attached to the bumper bar, a double headed free piston slidably disposed in the composite tube assembly, and a link system connecting the unsprung mass portion of the vehicle to the piston. During compression and expansion deflections of the unsprung mass portion, the link system effects bodily movement of the piston which initiates throttled flow of a working medium between a pair of variable volume chambers to damp a primary suspension spring. When the bumper bar is impacted, the free piston is held fixed and the support tube collapses to effect throttled flow of the working medium through an orifice which traverses the length of a third chamber thereby to absorb the energy of impact on the bar.

8 Claims, 6 Drawing Figures

PATENTED APR 17 1973 3,727,961

INVENTOR.
Horacio Shakespear
BY
Saul Schwartz
ATTORNEY

INVENTOR.
Horacio Shakespear
BY
Saul Schwartz
ATTORNEY

FLUID SHOCK ABSORBING BUMPER ASSEMBLY

This invention relates generally to devices for absorbing or dissipating energy and more particularly to an energy absorbing device adapted to function in a first mode as a vehicle shock absorber damping the primary suspension spring of the vehicle and in a second mode as a collision bumper energy absorber.

Automotive engineers have suggested that moderate speed collision damage to vehicles can be reduced or eliminated by absorbing the energy of impact before direct contact is made with the frame or sheet metal portions of the vehicle. Numerous proposals have been made for achieving this particular objective and one which has received considerable attention involves the use of energy absorbing devices in combination with a positionally displaceable collision bumper bar. In such a system, a collision impact on the bumper bar effects positional displacement of the latter against a resisting force generated by the energy absorbing device, the movement of a force through a finite distance, of course, effecting absorption or dissipation of the energy of impact. This arrangement, however, is more expensive than heretofore conventional bumper bar installations because of the addition of the energy absorbing device. An energy absorbing device according to this invention reduces the economic penalty by functionally combining into a single unit the suspension system shock absorber and the bumper bar energy absorber thereby to eliminate the redundancy of heretofore proposed systems.

The primary feature of this invention is that it provides a new and improved energy absorbing device particularly adapted for installation in an automotive vehicle and functional in a first mode to damp a suspension spring of the vehicle and in a second mode to absorb the energy of an impact on the collision bumper bar portion of the vehicle. Another feature of this invention resides in the provision of an energy absorbing device of the character described wherein a spring means replacing a conventional primary suspension spring of the vehicle may be readily incorporated, the spring means simultaneously imparting a preload to the bumper bar which maintains the latter in an extended position and which returns the bumper bar to the extended position after impact displacement. Yet another feature of this invention resides in the provision of braking means responsive to impact displacement of the bumper bar to isolate the unsprung mass portion of the vehicle from the impact force while simultaneously rendering the energy absorbing device operable in the second mode to absorb the energy of the impact. Still further features of this invention reside in the provision of an energy absorbing device including a pair of telescopic tubes between the bumper bar and the sprung mass portion of the vehicle, a shiftable free piston defining a pair of chambers between which a working medium is throttled to effect energy absorption, and spring means between one of the tubes and the free piston, and in the provision of link means connecting the free piston to the unsprung mass portion of the vehicle so that deflection of the latter effects damped deflection of the spring means while telescopic collapse of the tubes effects compression of the spring means for return of the bumper bar and simultaneous absorption of the energy of impact.

These and other features of this invention will be readily apparent from the following specification and from the drawings wherein.

Figure 1:
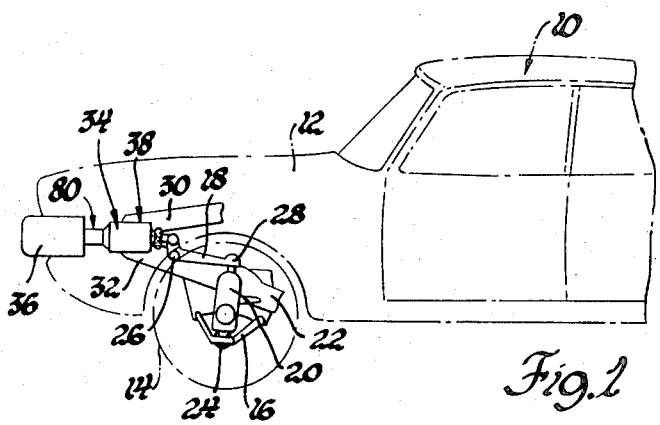
FIG. 1 is a partially broken away side elevational view of the forward portion of an automobile type vehicle having a sprung mass portion with a collision bumper bar thereon, an unsprung mass portion, and an energy absorbing device according to this invention disposed between the bumper bar and the unsprung mass portion.

Referring now to FIG. 1 of the drawings, thereshown in phantom is the forward portion of an automobile type vehicle designated generally 10. The vehicle includes a body portion 12 which is conventionally supported on a frame member, not shown, the combination of the frame member, the body portion, and the other components normally attached thereto, constituting the sprung mass portion of the vehicle. On the left side at the front, the sprung mass portion is connected to a left front wheel 14 through a structural arrangement including a lower control arm 16, an upper control arm 18, and a steering knuckle 20, a right front wheel, not shown, being similarly connected on the opposite side of the vehicle. The lower control arm is mounted on a left rail portion 22 of the frame member for pivotal movement about a longitudinal axis of the vehicle and is pivotally connected at 24 to the lower end of the steering knuckle. The upper control arm is of generally L-shaped configuration in elevation and is supported on the sprung mass portion of the vehicle at 26 for pivotal movement about a generally transverse axis of the vehicle. The distal end of the longer leg portion of the upper arm is pivotally connected to the upper end of the steering knuckle at 28. Accordingly, the wheel 14 and the steering knuckle, referred to hereinafter as the unsprung mass portion of the vehicle, are connected to the sprung mass portion of the vehicle in a generally conventional manner for compression and expansion deflections relative to the latter.

Referring again to FIG. 1, a pair of rigid structural brace members 30 and 32 forming part of the sprung mass portion of the vehicle are disposed on the left side of the latter and function to support an energy absorbing device or unit according to this invention designated generally 34, similar brace members, not shown, on the right side of the vehicle functioning to support a second, identical energy absorbing unit. The unit 34, in turn, functions as described hereinafter as a support for a front collision bumper bar 36 of the vehicle.

Figure 2:
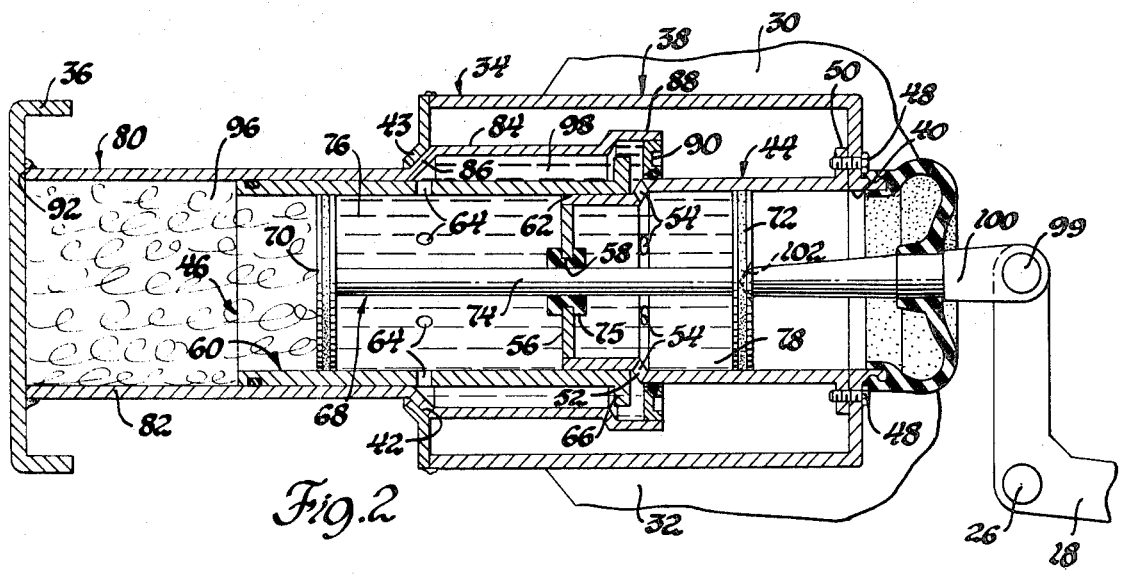
FIG. 2 is an enlarged view of a portion of FIG. 1 showing the energy absorbing device in a normal extended condition.
Figure 3:
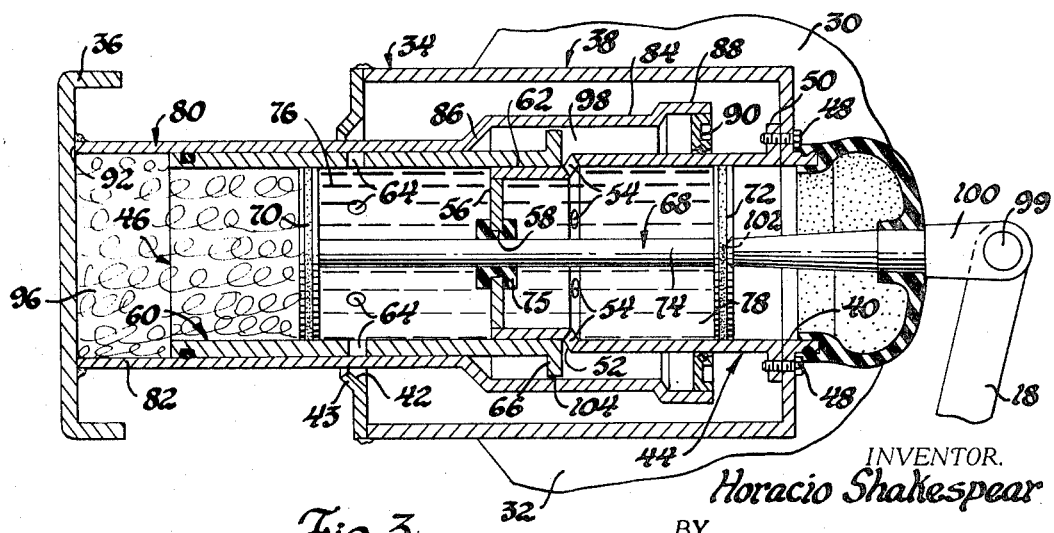
FIG. 3 is similar to FIG. 2 but showing the energy absorbing device in a collapsed condition.

As seen best in FIGS. 1, 2 and 3, the unit 34 includes an outer cylindrical housing 38 having a pair of axially aligned circular apertures 40 and 42 at opposite ends thereof, the aperture 42 having a flange 43 extending around the circumference thereof. The housing 38 is rigidly attached to the brace members 30 and 32 by conventional means, not shown. A first tube section 44 of a composite tube assembly 46 is rigidly attached to the housing 38 in alignment with the aperture 40 by a plurality of cap screws 48 projecting through the housing into threaded apertures in an annular flange portion 50 of the first tube section. The first tube section 44 has a shoulder 52 thereon through which extend a plurality of orifices 54, the distal end of the first section being sealingly closed by a plate 56 having a central circular aperture 58 therein. A second tube section 60 of the composite tube assembly 46 is rigidly connected to the first tube section at 62, as by welding, and includes a plurality of orifices 64 disposed therearound in a common transverse plane and an upturned annular flange 66. The second tube section projects through the aperture 42 in the housing 38 and cooperates with the first tube section in slidably and sealingly supporting a piston 68 having a first head 70 and a second head 72 rigidly interconnected by a cylindrical shank 74. The heads 70 and 72 are disposed on opposite sides of the plate 56 with the shank 74 projecting through the circular aperture 58 in the plate. A seal member 75 on the plate slidably engages shank 74 to enable the piston and composite tube assembly to cooperate in defining a pair of variable volume chambers 76 and 78.

Referring again to FIGS. 2 and 3, a support tube 80 including a small diameter portion 82 and a large diameter portion 84 interconnected by a shoulder portion 86 is supported on the composite tube assembly 46 for telescopic bodily movement between an extended position, FIG. 2, defined by abutting engagement between flange 43 on the housing and the shoulder portion 86 on the support tube and a retracted position, FIG. 3. The inboard end of the large diameter portion 84 of the support tube has an enlarged cylindrical section 88 adjacent thereto which is sealingly closed by a seal member 90 extending between the support tube and the first tube section 44. The outboard end of the support tube 80 is sealingly closed by the bumper bar 36 which is rigidly attached thereto at 92, as by welding, the support tube and the composite tube assembly thereby cooperating in mounting the bumper bar on the sprung mass portion of the vehicle for bodily movement between an extended position, FIGS. 1 and 2, and a retracted position, FIG. 3, corresponding respectively to the extended and retracted positions of the support tube. The bumper bar cooperates with the support tube, the second tube section and the piston head 70 in defining a variable volume chamber 96.

As seen best in FIG. 2, in the extended position of the support tube the combined length of the cylindrical section 88, the large diameter portion 84, and the shoulder portion 86 is sufficient to permit an annular chamber 98 formed thereby around the composite tube assembly to span the distance between the orifices 54 and the orifices 64. The variable volume chambers 76 and 78 and the annular chamber 98 are completely filled with an incompressible and flowable working medium, such as conventional hydraulic fluid, so that when the support tube is maintained in the extended position thereof and the piston 68 is shifted longitudinally within the composite tube assembly, the working medium flows between the chambers 76 and 78 through the orifices and the annular chamber 98 and around flange 66. The size of the orifices 54 and 64 are calibrated to effect a pressure drop thereacross so that the working medium is throttled to effect energy absorption in response to longitudinal shifting of the piston 68.

Referring now particularly to FIGS. 1 and 2, the shorter leg portion of the upper control arm 18 extends generally vertically up from pivot 26 and has pivotally attached to the distal end thereof at 99 a transfer link 100 the free end of which abuts the piston head 72 in a notch 102 in the latter. The weight of the sprung mass portion of the vehicle urges the unsprung mass portion into compression deflection which deflection urges the upper control arm in a counterclockwise direction and the transfer link 100 leftward. Accordingly, the weight of the sprung mass portion continuously urges the piston 68 leftward.

The variable volume chamber 96 is filled with a compressible medium, preferably a gas, which is introduced under substantial initial pressure and which functions as a primary suspension spring disposed between the bumper bar and the piston head 70. The initial pressure of the compressible medium is sufficient to maintain the piston 68 in the position shown in FIG. 2 corresponding to the normal curb height of the vehicle, the compressible medium reacting against the bumper bar which, accordingly, is thereby preloaded in the extended position under a force of predetermined magnitude dependent upon the linkage ratio of the control arm and the weight of the vehicle.

As seen best in FIGS. 2 and 3, the outer diameter of annular flange 66 on the second tube section of the composite tube assembly is just slightly smaller than the iner diameter of large diameter portion 84 of the support tube. Thus, when the support tube is moved telescopically from the extended toward the retracted position, the flange 66 traverses the length of the annular chamber 98 from the right end to the left end with an annular orifice 104, FIG. 3, being defined between the flange and the support tube. Further, initial leftward movement of the support tube from the extended position effects closure of the orifices 64 as the small diameter portion 82 of the support tube covers the orifices. With the orifices 64 effectively sealed, the incompressible medium in chamber 76 is trapped so that piston 68 is restrained or braked against bodily movement. Therefore, once the orifices 64 are closed, subsequent telescopic movement of the support tube toward the retracted position effects energy absorbing throttled flow of the incompressible medium in chamber 98 from one side of the flange 66 to the other and simultaneous compression of the compressible medium in chamber 96 between piston head 70 and the bumper bar.

Describing now the operation of the unit 34, when the vehicle is stationary the weight of the sprung mass portion maintains the support tube in the fully extended position under a preload as described hereinbefore. Thus, minor impacts on the bumper bar not exceeding the preload are rigidly resisted by the bar. When the vehicle is moving, irregularities in the roadway cause compression or upward deflections of the unsprung mass portion which effect leftward movement of the piston 68, the piston movement being resiliently resisted by the compressible medium which reacts against the extended support tube and thereby functions as the primary suspension spring. During the subsequent expansion deflection or rebound of the unsprung mass portion, the force of the compressible medium in chamber 96 maintains the piston head 72 in intimate contact with transfer link 100 so that no separation therebetween occurs.

Simultaneously with such resiliently resisted compression and expansion deflections of the unsprung mass portion, the unit 34 functions in a first energy absorbing mode to damp the primary suspension spring. More particularly, with the support tube held in the extended position, FIG. 2, by the compressible medium, bodily shiftable movement of the piston 68 effected by the upper control arm through the transfer link 100 causes throttled flow of the incompressible medium through orifices 54 and 64. The throttled flow effects energy absorption which, in turn, damps expansion of the compressible medium just as a conventional vehicle shock absorber damps a conventional primary suspension spring.

In the event of an impact on the bumper bar 36 exceeding the preload, the unit 34 functions to isolate the unsprung mass portion from the impact while absorbing the energy thereof in a second mode. More particularly, the impact on the bumper bar effects rightward movement of the support tube from the extended position, FIG. 2, toward the retracted position, FIG. 3, during which movement the orifices 64 are closed. With the orifices closed the piston 68 experiences no further movement so that the upper control arm is isolated from the impact while the piston head 70 serves as a reaction member for the compressible medium. Further rightward movement of the support tube under the influence of the impact initiates throttled flow of the incompressible working medium around flange 66 and through orifice 104 thereby absorbing the energy of impact and simultaneous further compression of the compressible medium in chamber 96. When the impact ceases, the compressible medium effects return of the support tube to the extended position and consequent opening of the orifices 64 for normal suspension operation.

Figure 4:
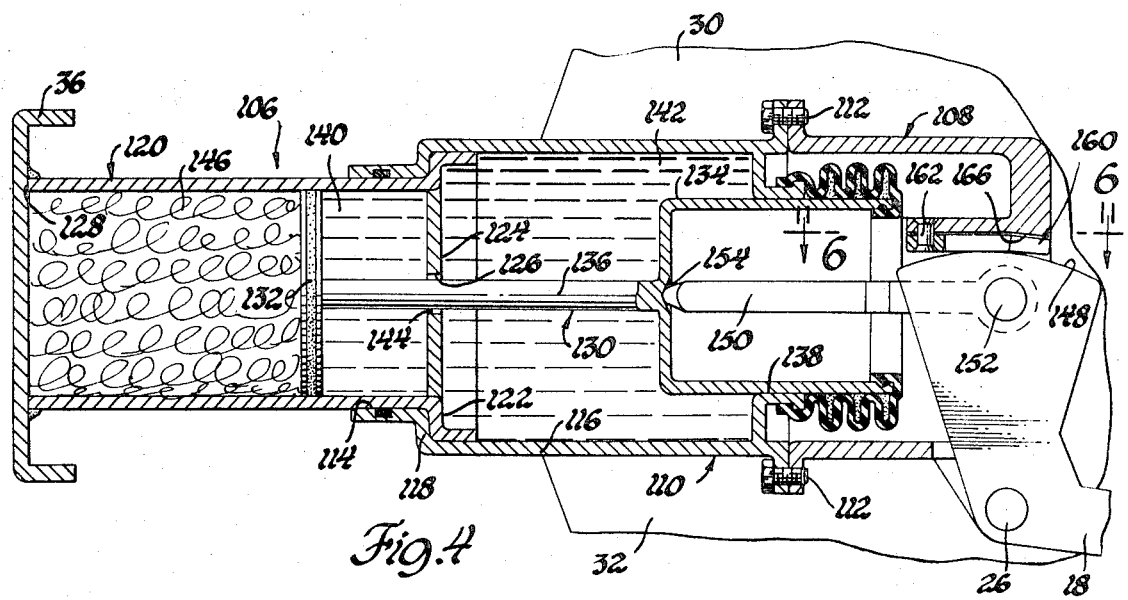
FIG. 4 is a view similar to FIG. 2 but showing a modified energy absorbing device according to this invention.
Figure 5:
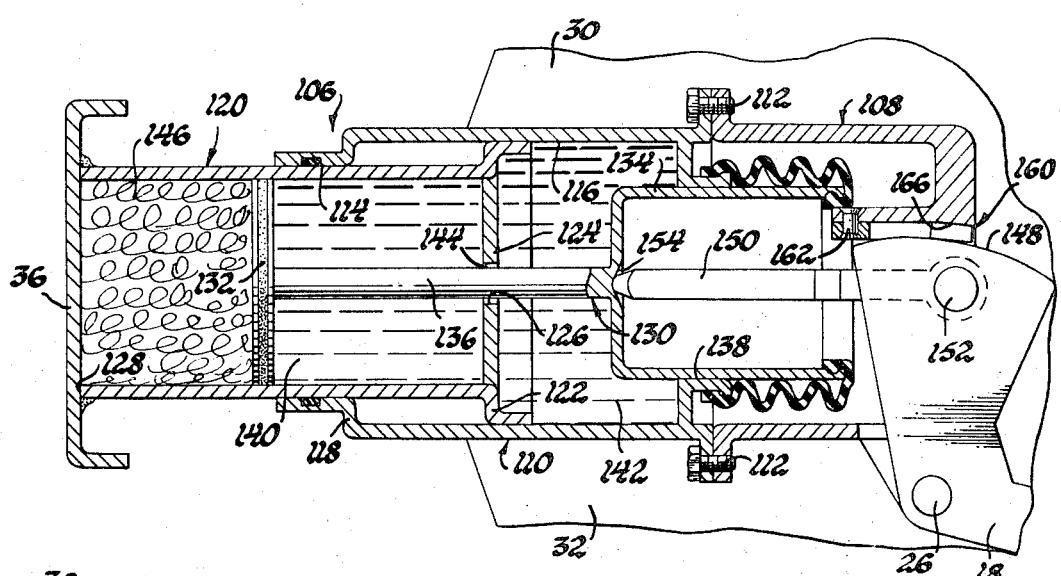
FIG. 5 is a view similar to FIG. 3 but showing the modified energy absorbing device.
Figure 6:
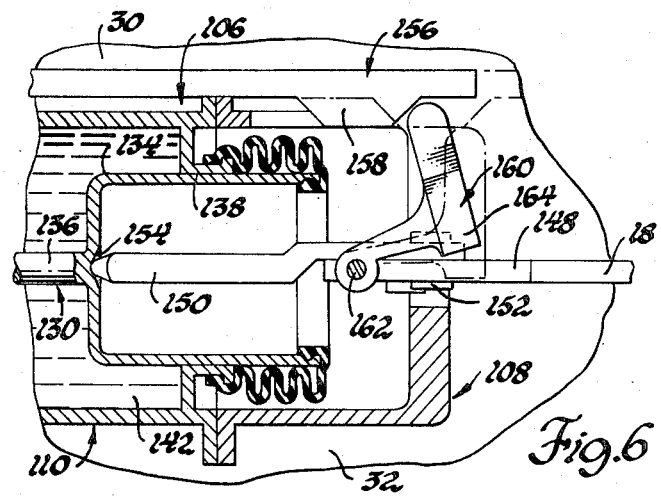
FIG. 6 is a sectional view taken generally along the plane indicated by lines 6—6 in FIG. 4.

Referring to FIGS. 4, 5 and 6, thereshown is a modified energy absorbing unit according to this invention designated generally 106 including an inboard housing shell 108 and a cylindrical outboard housing shell 110 attached to the inboard shell by a plurality of bolts 112. The inboard and outboard shells are rigidly attached to the brace members 30 and 32 by conventional means, not shown. The outboard shell has a small diameter portion 114 and a large diameter portion 116 interconnected by an annular shoulder 118. A support tube 120 having a stepped flange 122 at the inboard end thereof is telescopically supported on the outboard shell for movement between an extended position, FIG. 4, defined by abutting engagement between the shoulder 118 and flange 122, and a retracted position, FIG. 5. A plate member 124 having a central aperture 126 therein is welded to the support tube adjacent the inboard end of the latter while the outboard end thereof is sealingly closed by the bumper bar 36 welded to the support tube at 128, the extended and retracted positions of the support tube corresponding respectively to the extended and retracted positions of the bumper bar.

The modified unit further includes a piston 130 having a head 132 and an enlarged cylindrical cup-like section 134 interconnected by a shank 136. The head 132 is slidably mounted in the support tube 120 and the cup-like section 134 is slidably supported in a reduced diameter portion 138 of the outboard shell 110, the shank 136 extending through the aperture 126 in plate member 124. Accordingly, the outboard shell 110 cooperates with the piston, the support tube, and the plate member in defining a pair of variable volume chambers 140 and 142 interconnected by an annular orifice 144 around the shank 136 while the piston head 132 cooperates with the support tube and the bumper bar in defining a third variable volume chamber 146.

As seen best in FIGS. 4 and 5, the shorter leg portion of the upper control arm 18 is modified to form a generally flat vertical plate having a cam edge 148 thereon. A transfer link 150, pivotally attached to the upper control arm at 152, seats at its distal end in a depression 154 in the piston so that compression deflections of the unsprung mass portion effect leftward movement of the piston. The variable volume chambers 140 and 142 are completely filled with the incompressible medium described hereinbefore and the chamber 146 is filed with the compressible medium which, again, is introduced under substantial initial pressure. The diameter of cup-like section 134 is equal to the diameter of piston head 132 so that bodily shiftable movement of the piston results in equal but opposite changes in volume of each of the chambers 140 and 142.

In a manner similar to that descirbed hereinbefore with respect to unit 34, the compressible medium reacting between the piston head 132 and the support tube urges the latter under preload to the extended position while resiliently supporting the sprung mass portion with respect to the unsprung mass portion of the vehicle. The compression and expansion deflections of the compressible medium are damped by the modified unit through energy absorption in a first mode as the incompressible medium is throttled through orifice 144 between the chambers 140 and 142 in response to bodily shiftable movement of the piston initiated by the upper control arm.

As seen best in FIGS. 4, 5 and 6, a mechanical system is provided to restrain or brake the movement of the upper control arm when the bumper bar experiences an impact exceeding the preload thereby to permit the modified unit 106 to absorb the energy of impact in a second mode. The mechanical system includes a longitudinally extending rod 156, FIG. 6, which is slidably supported on the sprung mass portion of the vehicle for movement as a unit with the bumper bar. The rod 156 has a cam projection 158 thereon which is engageable on one leg of a bellcrank 160, the bellcrank being supported on the inboard shell 108 at 162 for pivotal movement between an unblocking position and a blocking position shown respectively in solid and broken lines in FIG. 6. The bellcrank includes a wedging portion 164 which is adapted to overlie the cam edge 148 on the shorter leg portion of the upper control arm in the blocking position of the bellcrank.

The cam edge is preformed with respect to a surface 166 of the inboard shell 108 such that clockwise pivotal movement of the upper control arm from the position shown in FIG. 4, corresponding to the normal curb height of the vehicle, effects a progressive decrease in the distance between the cam edge and the surface 166. Accordingly, when the bellcrank is rotated from the unblocking to the blocking position, subsequent clockwise pivotal movement of the control arm effects wedging of the portion 164 between the surface 166 and the cam edge 148 thereby to arrest further pivotal movement of the control arm.

Describing now the operation of the modified unit 106 in the second mode, the component elements thereof normally assume the relative positions shown in FIG. 4 when the vehicle is standing idle or traversing a smooth road. An impact on the bumper bar 36, of course, initiates rightward movement thereof from the extended toward the retracted position which movement is accompanied by concurrent movement of the rod 156 from the solid line position to the broken line position shown in FIG. 6 and pivotal movement of the bellcrank 160 from the unblocking to the blocking position. Initially, the force of impact on the bumper bar is transferred to piston head 132 through the compressible medium and urges the upper control arm in a clockwise direction corresponding to an expansion deflection of the unsprung mass portion. With the bellcrank in the blocking position, such movement of the control arm is quickly arrested so that the piston 130 is locked in a fixed position thereby to provide a reaction member for the compressible medium. Subsequent continued rightward telescopic collapse of the support tube, then, causes the plate member 124 to traverse the distance between the piston head 132 and the cup-like section 134 thereby to effect throttled flow of the incompressible medium from chamber 142 through orifice 144 into chamber 140, the throttled flow absorbing the energy of impact to the bumper bar. Simultaneously, the compressible medium in chamber 146 is further compressed against piston head 132 so that when the impact ceases, the compressible medium effects telescopic extension of the supprot tube and the bumper bar back to the extended position.

Having thus described the invention, what is claimed is:

1. In a vehicle including a sprung mass portion, an unsprung mass portion adapted for compression and expansion deflections relative to said sprung mass portion, a primary suspension spring means disposed between said sprung and said unsprung mass portions for resiliently resisting said compression deflections, and a collision bumper bar supported on said sprung mass portion for bodily movement from an extended position to a retracted position in response to an impact on said bar, the combination comprising, an energy absorbing unit including a pair of operating elements adapted for relative movement, said energy absorbing unit being adapted to effect irreversible energy absorption in response to relative movement between said operating elements, means supporting said energy absorbing unit on said sprung mass portion, first means connecting one of said operating elements of said energy absorbing unit to said unsprung mass portion responsive to compression and expansion deflections of said unsprung mass portion for effecting movement of said one operating element relative to the other of said operating elements thereby to damp said primary suspension spring means, and second means connecting said bumper bar to said other of said operating elements of said energy abosrbing unit responsive to movement of the bumper bar from the extended toward the retracted position for effecting movement of said other operating element relative to said one operating element thereby to absorb the energy of an impact on said bar.

2. In a vehicle including a sprung mass portion, an unsprung mass portion adapted for compression and expansion deflections relative to said sprung mass portion, a primary suspension spring means disposed between said sprung and said unsprung mass portions for resiliently resisting said compression deflections, and a collision bumper bar supported on said sprung mass portion for bodily movement from an extended position to a retracted position in response to an impact on said bar, the combination comprising, an energy absorbing unit actuable to absorb energy in either one of a first mode and a second mode, means supporting said energy absorbing unit on said sprung mass portion, first means connecting said energy absorbing unit to said unsprung mass portion responsive to compression and expansion deflections of said unsprung mass portion for effecting actuation of said unit in said first mode thereby to damp said primary suspension spring means, means disposed between said bumper bar and said first connecting means responsive to movement of said bar from the extended toward the retracted position for preventing actuation of said unit in said first mode, and second means connecting said bumper bar to said energy absorbing unit responsive to movement of the bumper bar from the extended toward the retracted position for effecting actuation of said unit in said second mode thereby to absorb the energy of an impact on said bar.

3. In a vehicle including a sprung mass portion, an unsprung mass portion adapted for compression and expansion deflections relative to said sprung mass portion, and a collision bumper bar supported on said sprung mass portion for movement relative to the latter from an extended position to a retracted position in response to an impact on said bumper bar, the combination comprising, a combination spring and energy absorbing damper unit including a pair of independently movable operating members adapted to effect energy absorption in respective ones of two modes and spring means resiliently resisting movement of each of said operating elements, means supporting said combination unit on said sprung mass portion, first means connecting said unsprung mass portion to one of said pair of operating members responsive to compression and expansion deflections of said unsprung mass portion for effecting movement of said one operating member against said spring means so that the latter effects primary suspension of said sprung mass portion relative to said unsprung mass portion while the energy absorption in the coresponding one of said two modes effects damping of said spring means, brake means responsive to movement of said bumper bar from the extended toward the retracted position for preventing movement of said one operating member, and second means connecting the other of said pair of operating members to said bumper bar responsive to movement of said bumper bar from the extended toward the retracted position for effecting movement of said other operating member against said spring means and energy absorption in the other of said two modes thereby to absorb the energy of impact on said bar, said spring means storing potential energy for returning said bumper bar to the extended position thereof.

4. In a vehicle including a sprung mass portion, an unsprung mass portion adapted for compression and expansion deflections relative to said sprung mass portion, and a collision bumper bar supported on said sprung mass portion for movement relative to the latter from an extended position to a retracted position in response to an impact on said bumper bar, the combination comprising, a combination spring and energy absorbing damping unit including a pair of telescopically related tube members and a free piston bodily shiftable relative to said tube members, means rigidly attaching one of said tube members to said sprung mass portion, means connected to said sprung mass portion operative to positively limit telescopic extension movement of the other of said tube members to an extended position corresponding to the extended position of said bumper bar, means connecting said other tube member to said bumper bar, spring means disposed between said other tube member and said free piston, connecting means between the unsprung mass portion and said free piston responsive to compression deflection of said unsprung mass portion for effecting bodily movement of said free piston in one direction and compression of said spring means between said free piston and said other tube member in the extended position of the latter so that said spring means resiliently suspends said sprung mass portion relative to said unsprung mass portion and generates a preload force on said other tube member resisting telescopic collapse thereof, said spring means effecting bodily movement of said free piston in the opposite direction during expansion deflection of said unsprung mass, means in said combination unit responsive to bodily movement of said free piston for effecting energy absorption in a first mode of said unit thereby to damp said spring means, means responsive to movement of said bar from the extended toward the retracted position for preventing bodily movement of said free piston thereby to prevent energy absorption in said first mode, and means in said combination unit responsive to telescopic collapse of said other tube member from the extended toward the retracted position corresponding to movement of said bumper bar under impact from the extended toward the retracted position for effecting energy absorption in a second mode of said unit thereby to absorb the energy of the impact on said bumper bar, said spring means being compressed between said free piston and said other tube member for effecting telescopic extension of the latter to the extended position.

5. In a vehicle including a sprung mass portion, an unsprung mass portion adapted for compression and expansion deflections relative to said sprung mass portion, and a collision bumper bar supported on said sprung mass portion for movement relative to the latter from an extended position to a retracted position in response to an impact on said bumper bar, the combination comprising, a first tube rigidly attached to said sprung mass portion, a seocnd tube disposed on said first tube for telescopic movement, means connecting said second tube to said bumper bar, a free piston slidably disposed in said first tube and including a pair of spaced heads, means connected to said sprung mass portion positivley limiting relative extension of said second tube to a fully extended position corresponding to the extended position of said bumper bar, spring means disposed between said second tube and said free piston, connecting link means between said free piston and said unsprung mass portion responsive to compression deflection of the latter for urging said free piston in a direction placing said spring means in compression between said piston and said second tube in the extended position of the latter thereby to apply to said second tube a preload force, said spring means resiliently suspending said sprung mass portion relative to said unsprung mass portion and effecting reverse bodily movement of said free piston during expansion deflection of said unsprung mass, means on said first tube defining a partition between said free piston head portions cooperable with the latter and with said first tube in defining a pair of variable volume chambers, means on said second tube defining an annular chamber around said first tube extending longitudinally on opposite sides of said partition and movable as a unit with said second tube relative to said first tube, orifice means effecting communication between said annular chamber and each of said variable volume chambers, a substantially incompressible flowable working medium disposed in each of said variable volume chambers and said annular chamber adapted for energy absorbing throttled flow through said orifice means in response to bodily movement of said free piston thereby to damp said spring means, means on said second tube responsive to telescopic collapse thereof from the extended position for sealing said orifice means in one of said variable volume chambers thereby to prevent bodily movement of said free piston relative to said first tube, and means on said first and said second tubes defining a flow orifice in said annular chamber adapted to effect energy absorbing throttled flow of said working medium in said annular chamber during collpase of said second tube from the extended position thereof thereby to absorb the energy of an impact on said bumper bar.

6. The combination recited in claim 5 wherein said spring means is a compressible gaseous medium disposed in said first and said second tubes on one side of said free piston under a predetermined initial pressure.

7. In a vehicle including a sprung mass portion, an unsprung mass portion adapted for compression and expansion deflections relative to said sprung mass portion, and a collision bumper bar supported on said sprung mass portion for movement relative to the latter from an extended position to a retracted position in response to an impact on said bumper bar, the combination comprising, a first tube rigidly attached to said sprung mass portion, a second tube disposed on said first tube for telescopic movement relative to the latter, means connecting said second tube to said bumper bar for movement as a unit therewith, means connected to said sprung mass portion positively limiting relative telescopic extension of said second tube to an extended position corresponding to the extended position of said bumper bar, a free piston having a pair of spaced head portions, means mounting said free piston on said first and said second tubes for bodily movement relative to each with one of said head portions on said first tube and the other on said second tube, spring means disposed between said second tube and said free piston, connecting link means between said free piston and said unsprung mass portion responsive to compression deflection of the latter for urging said free piston in a direction placing said spring means in compression between said piston and said second tube in the extended position of the latter thereby to apply to said second tube a preload force, said spring means thereby resiliently suspending said sprung mass portion relative to said unsprung mass portion and effecting reverse bodily movement of said free piston during expansion deflection of said unsprung mass, means on said second tube defining a fixed piston having orifice means therethrough, said fixed piston being disposed between said free piston head portions and cooperable with the latter and with said first and said second tubes in defining a pair of variable volume chambers interconnected by said orifice means, an incompressible flowable working medium disposed in each of said chambers and adapted for energy absorbing throttled flow through said orifice means in response to bodily movement of said free piston thereby to damp said spring means, a bellcrank, means mounting said bellcrank on said sprung mass portion for pivotal movement into and out of a braking position, a push rod disposed between said bellcrank and said bumper bar operative in response to movement of the latter from the extended toward the retracted position to pivot said bellcrank into the braking position, and cam means associated with said link means engageable on said lever in the braking position thereof during expansion deflection of said unsprung mass portion to brake said link means for preventing bodily movement of said free piston so that said working medium is throttled through said orifice means in an energy absorbing fashion during telescopic movement of said second tube from the extended position thereby to absorb the energy of an impact on said bumper bar.

8. The combination recited in claim 7 wherein said spring means is a compressible gaseous medium disposed in said second tube on one side of said free piston under a predetermined initial pressure.

* * * * *